United States Patent [19]
Payne et al.

[11] Patent Number: 4,839,898
[45] Date of Patent: Jun. 13, 1989

[54] OPTICAL RESONATING DEVICE

[75] Inventors: David B. Payne, Wickham Market; David B. Mortimore, Felixstowe, both of United Kingdom

[73] Assignee: British Telecommunications public limited company, United Kingdom

[21] Appl. No.: 148,660

[22] PCT Filed: May 28, 1987

[86] PCT No.: PCT/GB87/00369

§ 371 Date: Jan. 25, 1988

§ 102(e) Date: Jan. 25, 1988

[87] PCT Pub. No.: WO87/07445

PCT Pub. Date: Dec. 3, 1987

[30] Foreign Application Priority Data

May 30, 1986 [GB] United Kingdom ............... 8613192

[51] Int. Cl.⁴ .................................................. H01S 3/30
[52] U.S. Cl. .......................................... 372/6; 372/92; 350/96.15
[58] Field of Search .................. 372/6, 69, 3; 350/96.1, 350/96.15, 96.18; 378/18

[56] References Cited

U.S. PATENT DOCUMENTS

| 4,107,628 | 8/1978 | Hill et al. | 372/6 |
| 4,136,929 | 1/1979 | Suzaki | 378/6 |
| 4,530,097 | 7/1985 | Stokes et al. | 372/3 |
| 4,554,510 | 11/1985 | Shaw et al. | 372/6 |
| 4,637,025 | 1/1987 | Snitzer et al. | 372/1 |
| 4,674,830 | 6/1987 | Shaw et al. | 372/69 |
| 4,676,583 | 6/1987 | Hicks, Jr. | 372/6 |
| 4,720,160 | 1/1988 | Hicks, Jr. | 372/6 |
| 4,728,168 | 3/1988 | Alferness et al. | 372/6 |
| 4,748,687 | 5/1988 | Auracher et al. | 372/99 |

FOREIGN PATENT DOCUMENTS 2180392  3/1987  United Kingdom .

OTHER PUBLICATIONS

Tai et al, "All Fiber Gyroscope Using Depolarised Superluminescent Diode"; Electronics Letters, 8 May 1986, vol. 22, No. 10.
Applied Phys. Letters, Polarization Effects on Single-Mode Optical Fiber Sensors, S. K. Sheem et al., (2 Oct. 1979).
Second European Conference on Integrated Optics, 17-18 Oct. 1983, Florence, pp. 34-36; M. J. F. Digonnet et al: "Nd:YAG Single Crystal Fiber Laser".
Applied Physics Letters, vol. 23, No. 7, 10th Oct. 1973, pp. 388-389, American Institute of Physics, New York, US; J. Stone: "Neodymium-Doped Silica Lasers in End-Pumped Fiber Geometry."
IEEE Journal of Quantum Electronics, vol. QE-21, Apr. 1985, pp. 322-328, New York, US; R. R. A. Syms: "Resonant Cavity Sensor for Integrated Optics."

Primary Examiner—Léon Scott, Jr.
Attorney, Agent, or Firm—Nixon & Vanderhye

[57] ABSTRACT

An optical fiber laser comprises an optical resonant cavity defined by an optical fiber (1). First and second reflectors (8, 13; 14, 19) are optically coupled with respective ends of the fibre. The first reflector is adapted to reflect radiation at the lasing wavelength and the second reflector to be partially transparent to radiation at the lasing wavelength. Each reflector comprises a directional coupler (8; 14) having first and second pairs of ports. One each of the one pair of ports (11; 16) of each coupler (8; 14) is optically coupled with the cavity (1) while both ports of the other pair (9, 10; 17,18) are coupled with a respective loop of optical fibre (13, 19). The remaining port (12) of one coupler (8) is connected with a source of pumping radiation (6), and the remaining port (15) of the other coupler (14), is available to output laser radiation.

9 Claims, 1 Drawing Sheet

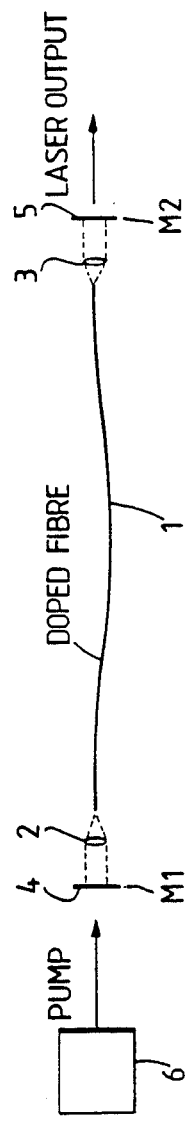
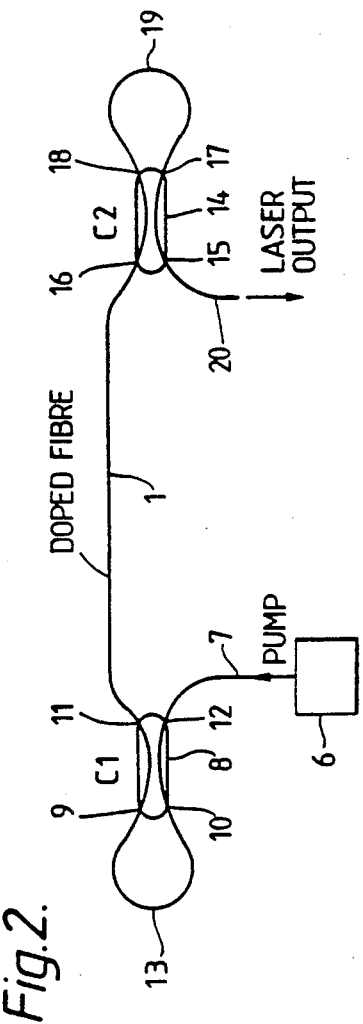

OPTICAL RESONATING DEVICE

OPTICAL RESONATING DEVICE

This invention relates to optical devices employing a resonant cavity.

Optical filters employing resonant cavities are known, for example, from U.S. Pat. No. 3,589,794 ("Optical Circuits", Enrique A. J. Marcatili, assigned to Bell Telephone Laboratories). That patent discloses a variety of optical filter devices based on resonant cavities employing an optical waveguide loop to form the end reflectors of the cavity.

Depending on the configuration of the device, the resonance of the cavity permits a variety of filter functions to be implemented such as, for example, band-pass filters, band-stop filters, channel-dropping filters and so forth. The devices described there are considered advantageous since they can readily be formed from optical waveguides embedded in a substrate.

Another form of an optical resonant device is known from GB No. 2180392A (R. J. Mears et al.) which discloses a laser device based on an optical fibre structure. The device described consists of an optical resonant cavity formed by the fibre and terminating in a mirror at each end. The device operates as an optically pumped laser light source, with a pump wavelength different to the lasing wavelength.

According to the present invention, a fibre based laser device comprises an optical fibre resonator having at least one optical fibre loop termination comprising a directional coupler having adjacent ports connected by a looped optical fibre path arranged to be reflective at the chosen lasing wavelength of the laser device and to be at least partially transmissive at the chosen pump wavelength of the device.

The reflectivity of the fibre loop termination can be selected by appropriately choosing the the coupling ratio of the directional coupler at the wavelength concerned: if the coupling ratio is 50:50 then the loop termination will theoretically be 100% reflective if the ratio is 100:0 or 0:100 then the loop termination will be completely transparent; any other degree of reflectivity can be obtained by using couplers with coupling ratios intermediate these extremes.

Preferably, the reflectivity of the termination at the lasing and pump wavelengths can be selected by employing a directional coupler which has wavelength-selective coupling properties such that its coupling ratio is close to 50:50 at the lasing wavelength and different from this even ratio at the pump wavelength.

An optical fibre based laser device having a fibre loop termination as reflector at the lasing wavelength is attractive for several reasons: coupling looses which would otherwise occur between the cavity and the reflectors are eliminated or greatly reduced, and the optical waveguide reflectors are temperature and mechanically stable. Moreover, the reflectivity of the fibre loop termination can be made at least very close to 100% at the lasing wavelength while at the same time providing good transmission of light at the pump wavelength into the cavity.

Similarly the reflectivity of the other termination can be readily adjusted to provide the required degree of transmission at the lasing wavelength in order to pass the optical output of the laser.

It is envisaged that in certain situations, a hybrid device could be produced in which one of the reflectors comprises a conventional mirror. Preferably, however, each of first and second reflectors comprises an optical fibre loop termination.

One of the most advantageous features of the invention is that the whole device, including its pump power supply path and its output path comprises a continuous optical fibre waveguide, which may, however, consist of several optical fibre sections spliced together. Furthermore, in comparison with the coventional alternatives, a wholly fibre based device offers a significant saving in production costs.

In one example, the loop termination forming one of the reflectors is substantially 100% reflecting at the laser wavelength (assuming zero losses) and the reflectivity of the other reflector is chosen for optimum output. The device can be pumped by a band of wavelengths shorter than the lasing wavelengths. This light can be coupled into the fibre through the 100% reflecting reflector, by choosing a fibre loop termination which is transmissive at the pump wavelength band.

A directional coupler is a device which will transfer a proportion of optical power from one waveguide (fibre) into another. These devices generally have four ports, two "in" and two "out", designated according to the relevant direction of propagation of light through the device. A coupler is operable bi-directionally in the sense that light can travel through the device from left to right or right to left. Thus, light propagating into one of the "inputs" of the device will be divided and will appear in both "outputs"; conversely light propagating into an "output" will appear in both "inputs". If the two "output" (or "input") ports are joined together to form a loop then light propagation into a corresponding "input" ("output") will be divided and reflected back to the "inputs" ("outputs"). The propagation of optical power reflected back along the incident fibre depends upon the coupling coefficient of the optical coupler. By varying this coupling coefficient, power reflectivities from 0 to 100% may be achieved.

The directional couplers used in fibre loop terminations should meet several performance requirements. The couplers should have low excess loss, (i.e. the proportion of light lost in traversing the coupler should be small) and they should be both mechanically and temperature stable. A coupler which satisfies these requirements is the tapered, fused fibre coupler.

For example, it is particularly preferable if the coupler of the first fibre termination is arranged such that substantially 50% of radiation at the resonant wavelength entering the coupler from the cavity through a port of one pair of ports is coupled with each of the first and second ports of the other pair of ports, and the coupler of the other reflector is arranged such that proportions other than 50% of radiation at the resonant wavelength entering the port coupled with the resonant cavity is coupled with the first and second ports of the other pair of ports.

In this specification, the optical fibres are preferably monomode optical fibres although in some applications multimode optical fibres are also acceptable.

In this specification, the term optical is intended to refer to that part of the electro-magnetic spectrum which is generally known as the visible region together with those parts of the infra-red and ultra-violet regions at each end of the visible region which are capable of being transmitted by dielectric optical waveguides such as optical fibres.

Examples of a laser according to the invention will now be described and contrasted with a conventional construction of the device with reference to the accompanying drawings, in which:

FIG. 1 illustrates a conventional optical fibre laser; and

FIG. 2 illustrates an example of a laser according to the invention.

FIG. 1 illustrates a fibre laser resonator having a doped, optical fibre resonating cavity 1 positioned between a pair of lenses 2, 3. A mirror 4 is positioned adjacent the lens 2 and is substantially 100% reflecting at the laser wavelength (assuming zero looses). A mirror 5 is positioned adjacent the lens 3 and has a reflectivity which is chosen empirically for optimum output. In other words, the mirror 5 is partially transmissive for radiation at the laser wavelength. The laser is pumped by a band of wavelengths, shorter than the laser wavelength, originating from a pump source 6. Light from the pump source is coupled into the fibre 1 through the mirror 4 which is transmissive at the pump wavelength band.

FIG. 2 illustrates an example of a fibre laser resonator according to the invention. Those parts of the resonator in FIG. 2 which are the same as the resonator of FIG. 1 are indicated by the same reference numerals. In this case, the pump radiation source 6 is coupled into the doped fibre 1 via an optical fibre 7 with a directional coupler 8. The directional coupler 8 has two pairs of first and second ports, 9,10; 11,12. Incoming radiation at any one of the ports 9,10; 11,12 of one pair is coupled in predetermined portions 0-100% with the two ports of the other pair. Thus, for example, radiation incoming at the port 11 will be coupled with the ports 9, 10. The ports 9, 10 are coupled together via a loop of optical fibre 13.

The structure of the directional coupler 8 is such that when the coupling of the device is exactly 50%, all light input at one of the ports will be reflected back along its input path. Thus, by arranging the coupler 8 to have 50% coupling at the lasing wavelength, the coupler behaves as a 100% reflecting mirror. However, since the coupling ability of the coupler 8 is wavelength dependent, it does not completely reflect radiation at the band of wavelengths of the pump 6 and so these wavelengths are coupled into the optical fibre 1.

Another optical coupler 14 similar to the coupler 8 is connected to the other end of the fibre 1. One port 16 of a first pair of ports 15,16 of the coupler 14 is connected to the fibre 1, whilst the second port 16 of this first pair is free to pass the resultant output radiation from the laser into an output optical fibre 20. The second pair of ports 17,18 of the coupler 14 are coupled together via a loop of optical fibre 19. The degree of coupling achieved by the coupler 14 is set to allow a proportion of light received by the coupler from the optical fibre 1 to be transmitted to the output fibre 20 (i.e. the coupler with loop is not 100% reflective at the lasing wavelength).

The coupling ratio of directional couplers can be made to vary with wavelength. This effect can be used to couple pump light into the laser cavity with little loss. The coupling ratio of coupler 8 is arranged to be 50% at the lasing wavelength and 0 or 100% at the pump wavelength. Wavelength selectively can also be used to suppress unwanted laser transitions.

The couplers 18, 14 can be of the fused fibre, or polished block types and the degree of coupling achieved can be set during manufacture or can be variable by making the surrounding material of variable refractive index. For example, this surrounding material may be made of electro-optic material.

The looped connections need not be provided by separate lengths of optical fibre, but may, for example, be formed integrally with the couplers at manufacture. Indeed, the complete device including resonant cavity and reflectors may be formed from a single optical fibre.

To provide further wavelength selectivity a concatenation of loop reflector terminations may be used in combination with the laser described.

Note that, for a zero loss coupler, the power reflectivity R is given by:

$$R = 4K(1-K)$$

where K is the coupling co-efficient. (K=0 represents zero coupling, K=0.5 is 50% coupling and K=1 is complete cross coupling).

We claim:

1. An optical fibre based laser device comprising an optical fiber resonant cavity having first and second reflectors for reflecting radiation at a predetermined resonating wavelength characterised in that:
   at least one of said reflectors is an optical loop reflector comprising a directional optical coupler having a first and a second input and a first and a second output,
   said first input being optically coupled to said optical fibre resonant cavity,
   said first and second outputs being optically coupled together, and
   the optical loop reflector being reflective at said resonating wavelength and at least partially transmissive at a predetermined pump wavelength.

2. A device according to claim 1, wherein each of said first and said second reflectors comprises an optical fibre loop reflector.

3. A device according to claim 2 wherein the optical resonant cavity and the two reflectors comprise a single optical fibre.

4. An optical fibre based laser device comprising:
   an optical fibre resonant cavity having first and second ends;
   a first optical reflector disposed at said first end of the cavity for reflecting optical signals of a first wavelength within said cavity and for passing optical signals of a second wavelength into said cavity;
   a second optical reflector disposed at said second end of the cavity for partially reflecting optical signals of said first wavelength within said cavity and for partially passing optical signals of said first wavelength out of said cavity;
   at least one of said optical reflectors being an optical loop reflector having
   (a) a directional optical coupler having a first pair of ports A,B and a second pair of ports C,D with optical signals input to either port of one pair being coupled to the other pair of ports by a predetermined coupling co-efficient K,
   (b) both parts of one of said pairs of ports being optically coupled together; and
   (c) one port of the remaining pair of ports being optically coupled to one end of said cavity; and
   (d) the other port of the remaining pair of ports being optically coupled to pass optical signals to or from said optical cavity.

5. An optical fibre based laser device as in claim 4 wherein both of said optical reflectors are optical loop reflectors as therein defined and wherein:
  the coupler in said first optical reflector has a coupling co-efficient of approximately 0.5 at said first wavelength with its said other port being optically coupled to a pump source of optical signals of said second wavelength; and
  the coupler in said second optical reflector has a coupling co-efficient differing from 0.5 at said first wavelength and its said other port being optically coupled to pass as laser output optical signals of said first wavelength.

6. An optical fibre based laser device as in claim 5 wherein the said pairs of optically coupled together ports are connected by optical fibre.

7. An optical fibre based laser device as in claim 6 wherein the optical resonant cavity and the optically coupled together pairs of ports are formed from and include a single continuous optical fibre.

8. An optical fibre based laser device as in claim 4 wherein the said pair of optically coupled together ports are connected by optical fibre.

9. An optical fibre based laser device as in claim 8 wherein the optical resonant cavity and the optically coupled together pair of ports are formed from and include a single continuous optical fibre.

* * * * *